(12) United States Patent
Quast

(10) Patent No.: US 11,212,370 B1
(45) Date of Patent: Dec. 28, 2021

(54) CONTEXT AWARE CAPABILITIES

(71) Applicant: SAP SE, Walldorf (DE)

(72) Inventor: Torsten Quast, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/988,476

(22) Filed: Aug. 7, 2020

(51) Int. Cl.
*H04L 29/06* (2006.01)
*G06F 16/23* (2019.01)
*H04L 12/24* (2006.01)

(52) U.S. Cl.
CPC .......... *H04L 67/42* (2013.01); *G06F 16/2379* (2019.01); *H04L 41/0866* (2013.01); *H04L 41/0873* (2013.01)

(58) Field of Classification Search
CPC . H04L 67/42; H04L 41/0866; H04L 41/0873; G06F 16/2379
See application file for complete search history.

(56) References Cited

U.S. PATENT DOCUMENTS

| | | | | |
|---|---|---|---|---|
| 2002/0078039 | A1* | 6/2002 | Cereghini | G06F 16/2465 |
| 2005/0010566 | A1* | 1/2005 | Cushing | G06F 16/2423 |
| 2005/0038778 | A1* | 2/2005 | Styles | G06F 16/24547 |
| 2006/0004716 | A1* | 1/2006 | Hurst-Hiller | G06F 16/9535 |
| 2010/0198777 | A1* | 8/2010 | Lo | G06F 16/283 707/601 |
| 2018/0062936 | A1* | 3/2018 | Poe | H04L 41/14 |
| 2018/0095739 | A1* | 4/2018 | Baset | G06F 21/6218 |
| 2019/0196890 | A1* | 6/2019 | Bucchi | G06F 16/24545 |

* cited by examiner

*Primary Examiner* — Alina A Boutah
(74) *Attorney, Agent, or Firm* — Fountainhead Law Group P.C.

(57) ABSTRACT

Different server engines may be used to process queries from a client application. The different engines may have different capabilities and support different features. A server may only provide system level capabilities such that it will indicate that it is not capable of supporting a particular feature if not all of its engines are capable of supporting that feature. In order to use features actually supported, a client application may override the server's feature support information using a client library. The client application may render user interface dialogs supporting a particular feature based on the feature support information from the server as modified by the client library. The dialog may be used to query the server using the feature indicated as not being supported by the server at a system level.

20 Claims, 7 Drawing Sheets

CONTEXT AWARE CAPABILITIES

BACKGROUND

The present disclosure pertains to client and server systems, and in particular to context aware capabilities for client applications.

In certain situations, there may be a mismatch of supported features between a client and a server. For instance, a software application running at the client may support a feature for querying a server while an engine of that server that handles the request may not be capable of handling that feature, or vice versa. This situation may occur if there are multiple different clients using the same engine at the server, for example. This situation may also occur when new features are developed, in which case a server might support a new feature while that feature is not yet fully supported by the client, or not yet activated. For on-premise clients, this problem is worse because older versions on the client side may not be forced to update to support features that are now supported by the server's engine. Accordingly, there is a need for improved capability matching between clients and servers.

The present disclosure addresses these issues and others, as further described below.

SUMMARY

One embodiment provides a computer system. The computer system includes one or more processors. The computer system also includes one or more machine-readable medium coupled to the one or more processors. The machine-readable medium stores computer program code comprising sets instructions executable by the one or more processors. The instructions are executable by the one or more processors to obtain a feature support list of a server having a first engine. The feature support list indicating that the server does not support a first feature for a first operation based on the first engine not supporting the first feature. The instructions further executable to obtain a first input to an application to configure a query to the server using the first operation in the first context. The instructions further executable to determine the first context of the first operation within the application based on the first input. The instructions further executable to determine whether a first capability flag indicates that the first feature is supported in the first context. The first capability flag overrides the feature support list of the server with respect to the first feature. The instructions further executable to determine whether to render a first dialog or a second dialog for configuring the first operation based on the first capability flag. The first dialog including one or more interface elements for configuring the first operation using the first feature and the second dialog not including the one or more interface elements. The first dialog being rendered when the first capability flag indicates that the first feature is supported in the first context, overriding the feature support list of the server indicating that the server does not support the first feature.

Another embodiment provides one or more non-transitory computer-readable medium storing computer program code. The computer program code includes sets of instructions to obtain a feature support list of a server having a first engine. The feature support list indicating that the server does not support a first feature for a first operation based on the first engine not supporting the first feature. The computer program code further including sets of instructions to obtain a first input to an application to configure a query to the server using the first operation in the first context. The computer program code further including sets of instructions to determine the first context of the first operation within the application based on the first input. The computer program code further including sets of instructions to determine whether a first capability flag indicates that the first feature is supported in the first context. The first capability flag overriding the feature support list of the server with respect to the first feature. The computer program code further including sets of instructions to determine whether to render a first dialog or a second dialog for configuring the first operation based on the first capability flag. The first dialog including one or more interface elements for configuring the first operation using the first feature and the second dialog not including the one or more interface elements. The first dialog being rendered when the first capability flag indicates that the first feature is supported in the first context, overriding the feature support list of the server indicating that the server does not support the first feature.

Another embodiment provides a computer-implemented method. The method includes obtaining, by a client computer, a feature support list of a server having a first engine. The feature support list indicating that the server does not support a first feature for a first operation based on the first engine not supporting the first feature. The method further including obtaining, by the client computer, a first input to an application to configure a query to the server using the first operation in the first context. The method further including determining, by the client computer, the first context of the first operation within the application based on the first input. The method further including determining, by the client computer, whether a first capability flag indicates that the first feature is supported in the first context. The first capability flag overriding the feature support list of the server with respect to the first feature. The method further including determining, by the client computer, whether to render a first dialog or a second dialog for configuring the first operation based on the first capability flag. The first dialog including one or more interface elements for configuring the first operation using the first feature and the second dialog not including the one or more interface elements. The first dialog being rendered when the first capability flag indicates that the first feature is supported in the first context, overriding the feature support list of the server indicating that the server does not support the first feature.

The following detailed description and accompanying drawings provide a better understanding of the nature and advantages of the present disclosure.

DETAILED DESCRIPTION

Figure 1:
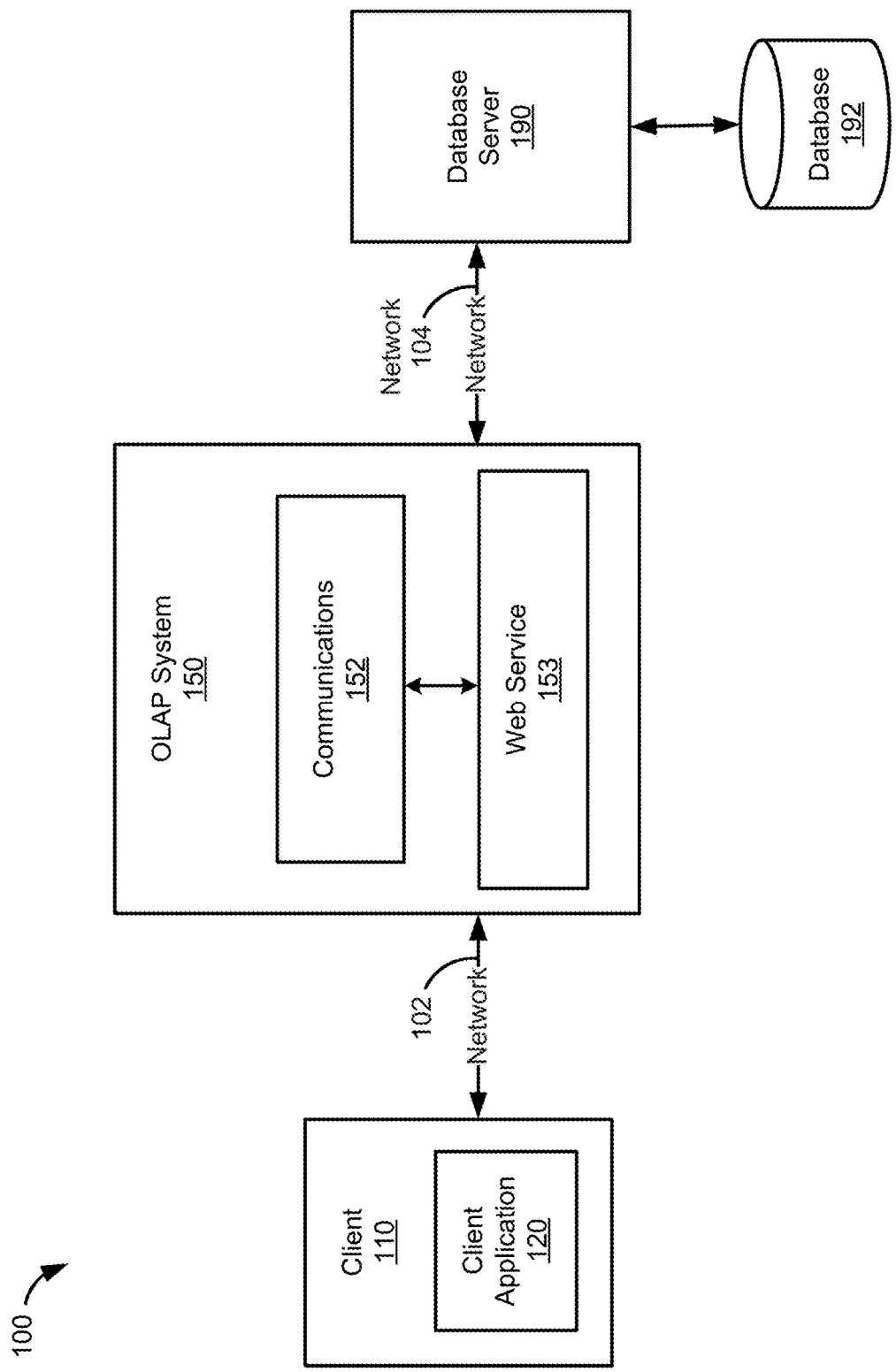
FIG. 1 shows a diagram of a system including a client and an Online Analytical Processing (OLAP) system, according to an embodiment.

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein.

In the figures and their corresponding description, while certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, terms "first," "second," "third," "fourth," "fifth," "sixth," "seventh," "eighth," "ninth," "tenth," etc. as used herein do not necessarily indicate an ordering or sequence unless indicated. These terms may be used for differentiation between objects or elements without a specific ordering.

As mentioned above, there may be a mismatch of supported features between a client and a server in certain situations. For instance, the software application running at the client may support a feature for querying the server but an engine of the server that handles the request may not be capable of handling that feature, or vice versa. In addition, different server engines may be used to process queries from a client application. The different engines may have different capabilities and support different features. In some cases, a server may only provide system-level capabilities to clients, such that the server will indicate that it is not capable of supporting a particular feature if not all of its engines are capable of supporting that feature. That is, the system-level capabilities of the server will indicate that a feature is not supported if one or more of its engines do not support that feature. In order to use features actually supported at the engine-level (e.g., by one or more engines of a server), a client application may override the server's system-level feature support information using a client library. The client application may render user interface dialogs supporting a particular feature based on the feature support information received from the server as modified by the client library. The dialog may be used to query the server using the feature indicated as not being supported by the server at a system level and the server may be able to process the query using an engine that supports that feature.

One situation where a mismatch of supported features can occur is between an analytics application at a client computer and an Online Analytical Processing (OLAP) system. The structure of an OLAP system is described with respect FIG. 1 and the improved capability matching, which may be implemented in the system of FIG. 1, is described below with respect to FIG. 2.

FIG. 1 shows a diagram of a 100 system including a client computer system 110 and an OLAP server system 150, according to an embodiment. The client computer system 110 may be a personal computer, a laptop, a smart phone, or a tablet, for example. The client computer 110 is running a client application 120. The client application 120 may be web-based or may reside locally on the client 110. The client application 120 may be used to interact with and to configure and view reports of data, for example.

The client 110 may communicate with the OLAP system 150 over a network 102. The client 110 may implement a client library supporting context aware capabilities as further described below. The OLAP system 150 may be configured to provide a user interface for the client application 120. The user interface may be provided via a web service 153 using a cloud-based computer network architecture, for example. The OLAP system 150 may be implemented as an individual computer hardware server or as an array of computer hardware servers logically coupled together and working in a functionally coordinated manner The OLAP system 150 may further be in communication with a database server 190 a network 104. The database server 190 is further in communication with one or more databases 192 adapted to store data. In some embodiments, the database server 190 and the databases 192 are part of the OLAP system 150. The database server 190 can be configured to perform data accesses operations on data stored in the databases 192. The database server 192 may be implemented as an individual computer hardware server or as an array of computer hardware servers logically coupled together and working in a functionally coordinated manner. Depending on the type of database server 150, data operations may range from simple operations, such as storing and retrieving data, to more complex operations such as calculating statistics based on the data, or arranging, modifying, or formatting data.

The database server 190 may further include a database management system ("DBMS") that communicates with the one or more databases for the purposes of storing and retrieving data to or from the databases. A DBMS may be configured as a computer software application that interacts with the database and other applications or users to capture and analyze data. The DBMS may be designed to allow for definition, creation, querying, update, and administration of databases, for example. A database "query" may comprise a request for data or information from a database table or combination of database tables (or other data structures) in the database. Queries are the mechanism for retrieving information from a database and generally consist of questions presented to the database in a predefined format. This data may be generated as results returned by the SQL, or as pictorials, graphs, etc.

The network 102 and network 104 may be implemented as a single wired or wireless network, or multiple separate networks in communication with one another. For example, the networks described herein can be implemented as a local area network ("LAN"), wide-area network ("WAN"), combination of LANs and WANs, the Internet, for example.

Further, the network 102 and 104 may be implemented in a cloud-based network configuration.

As described herein, there may be a mismatch of supported features between the client 110 and the OLAP system 150. For instance, the client application 120 running at the client 110 may support a feature for querying the OLAP system 150 (or a database of the OLAP system 150), but an engine of the OLAP System 150 that handles the request may not be capable of handling that feature, or vice versa. This mismatch problem may also occur if there are multiple different clients using the same engine at the server. This mismatch problem may also occur if new features are developed, in which case a server might support a new feature which is not yet fully supported by the client, or only after activating a feature toggle. For on-premise clients, this problem may be worse because older versions on the client side may not be forced to be updated to support new features that are now supported by the server's engine.

In order to improve capability matching between clients and servers, a client application (e.g., client application 120) may obtain a list of the server's capabilities (e.g., system-level capabilities). The list of server capabilities may be a list of features with corresponding Boolean values indicating whether the feature is supported or not, for example. The list of the capabilities may be obtained by the client before making queries to the server.

Figure 2:
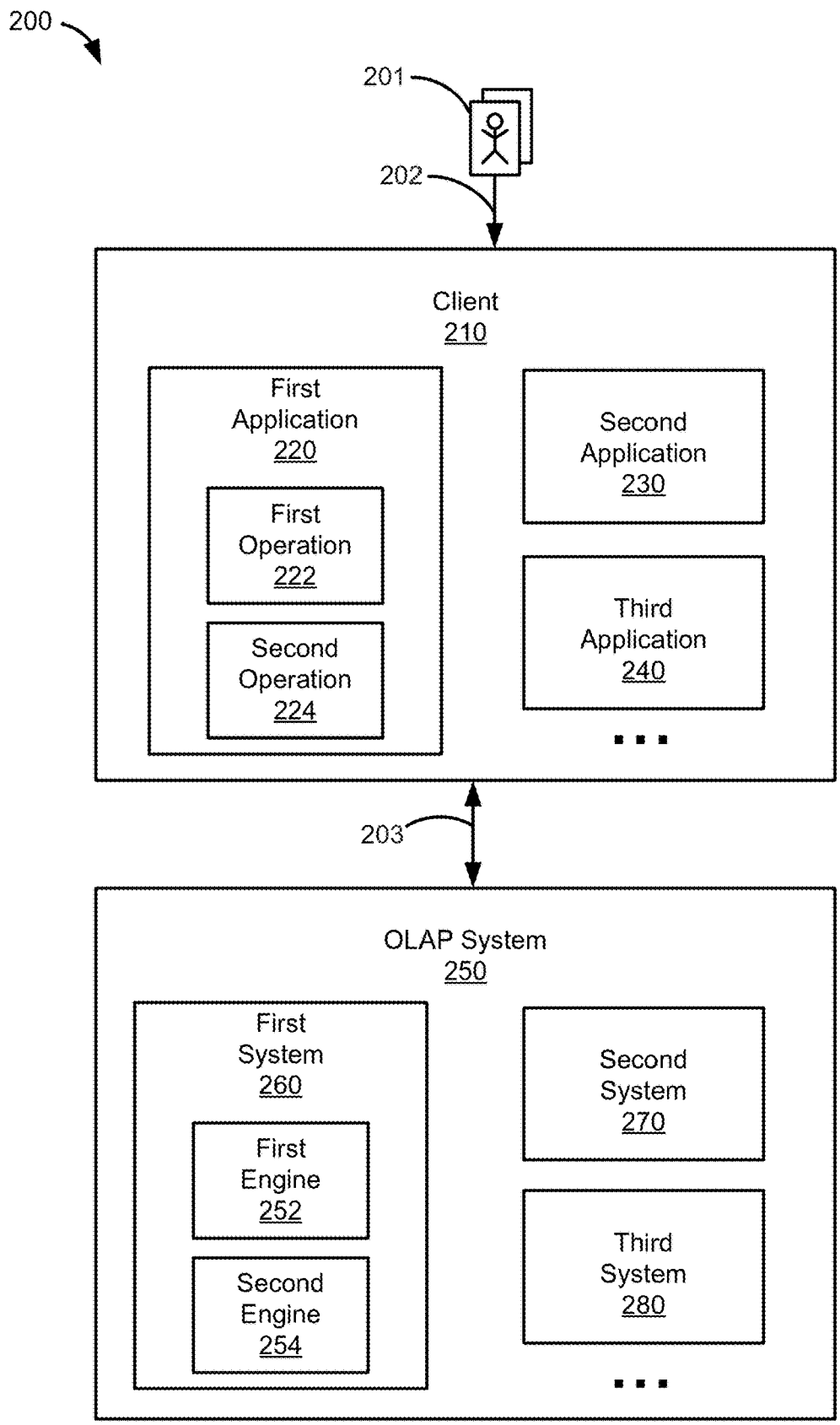
FIG. 2 shows a diagram of a client system communicating with an OLAP system, according to an embodiment.

FIG. 2 shows a diagram of a client system 210 communicating with an OLAP system 250, according to an embodiment. The client 210 may be operated by a user 201 providing inputs 202 to the client via a user interface. The client 210 may be configured similar to the client computer system 110 of FIG. 1 described above. The OLAP system 250 may be configured similar to the OLAP server system 150 of FIG. 1 described above.

The client 210 may be configured to execute program code for a first application 220. The first application 220 may be configured similar to the client application 120 of FIG. 1 discussed above. For instance, the first application 220 may be an analytics application (e.g., an application providing visualizations and data for analysis of business information). The client 210 may also be configured to execute a second application 230 and a third application 240, which may be different analytics applications, for example. The client 210 may also be configured to run other applications (not shown). The client 210 may be configured to communicate with the OLAP system 250 over a network 203 (e.g., an intranet or the Internet).

The OLAP system 250 may include a first system 260. The first system 260 may include one or more computer servers. The first system 260 may provide a business intelligence platform configured to generate reports and analytics, for example. The OLAP system 250 may further include a second system 270 and a third system 280. The second system 270 may be a data warehousing system for consolidating information, for example. And the third system 280 may be a database system, such as an in-memory database system for processing analytical workloads, for example. In other embodiments, the first, second, and third systems 260, 270, and 280 may provide other or additional functionality and features.

Certain operations and features supported by the first, second, and third applications 220, 230, 240 may be implemented by making a query to the OLAP system 250. Accordingly, the client 210 may need to determine whether the OLAP system 250 supports these operations and features in order to match capabilities. To facilitate capability matching, each of the systems of the OLAP system 250 may send a list of supported features to the client 210. In some embodiments, this communication may be performed by middleware using a specific protocol to handle this system capabilities handshake. The client 250 may determine an intersection of the list of supported features of the OLAP system 250 and the capabilities supported by the applications of the client. That is, the client 250 can determine which operations and features are supported by both the OLAP system 250 and the client 210.

For example, the first, second, and third systems 260, 270, and 280 of the OLAP system 250 may provide a list of supported features indicating that they each support a "filtering" operation (e.g., selecting and providing subsets of data). Such filtering operations may allow for "complex" filtering or they may be limited to less complex "cartesian" filtering as further described below. In some embodiments, only the third system 280 may support a "ComplexFilter" feature while the first and second systems 260, 270 do not support the "ComplexFilter" feature, being limited to the "CartesianFilter" feature. Accordingly, the client 250 may be configured to not generate queries for the first system 260 or the second system 270 using the "ComplexFilter" feature and may instead generate queries using the "CartesianFilter" feature.

Complex filtering and cartesian filtering are two different types of filtering that may be supported by an engine at a server. Consider a first dimension having members A1 and A2, and a second dimension having members B1 and B2, represented by Table 1 below.

TABLE 1

|    | B1 | B2 |
|----|----|----|
| A1 |    |    |
| A2 |    |    |

Complex filtering can filter (A1 AND B1) OR (A2 AND B2) while Cartesian filtering cannot. Cartesian filtering may only filter complete rows or columns, such as B1 AND (A1 OR A2). If complex filtering were supported by one or more engines of the server, it would be advantageous to enable this functionality in contexts where it is supported.

One problem that may arise when determining capability intersections is that it may only happen on the system level. That is, the capability intersection may not reflect that some features can be used in multiple places at a particular server system. In some places a feature which was reported as not supported might actually be supported, or vice versa. This may occur where a particular server system uses different engines to handle different portions of a request from the client. For example, the first server system 260 of the OLAP system 250 may include a first engine 252 and a second engine 254. In some embodiments, the first engine 252 may be capable of performing a first operation in a first context using a first feature while the second engine 254 may not be capable of performing the first operation in a second context using the first feature.

For example, going back to the filtering example, a filtering operation may be used in both a "RestrictedMeasure" context and a "DimensionMemberVariable" context within an application. The software application at the client may be configured to implement the ComplexFilter feature so that the user of the application can create more detailed filters, but this feature can only be implemented if the server system supports that feature. Otherwise, filtering operations may be limited to the CartesianFilter feature. In some embodiments, complex filters may be supported in the RestrictedMeasure context. In one example, a particular server system may indicate that it does not support the ComplexFilter feature, thereby indicating that this feature should not be used in a query filter by the client 210. However, that same server may actually support the ComplexFilter feature when creating a restricted measure because a different engine of the system is processing the "restricted measure" and that engine is capable of supporting the ComplexFilter features. That is, ComplexFiltering actually is supported in the restricted measure context based on engine-level capabilities.

Therefore, checking for supported features at the system level may not be sufficient to provide all existing functionality to the client 210 since matching the features supported at the system level (e.g., by all engines of a server or system) might return the wrong answer. This is problematic because the client may be forced to provide the user with a simple filter dialog to use based on the CartesianFilter feature in case the ComplexFilter feature is not supported by the server. The user of the client application may be losing functionality by not being able to use a more advanced filter dialog available to use in case the ComplexFilter feature is supported. Features and advantages of the context aware capabilities techniques described herein enable the user to regain more complex and advanced functionality that is actually supported at the server. Furthermore, this can be achieved without modification to the server's capability handshake, which may be impractical to modify (e.g., due to technical difficulties or for compatibility with other systems). While filtering operations are described herein, this is just one example operation and the techniques for context aware capability can be applied to other operations in a similar manner.

In order to provide the user with the dialogs supporting features that are actually available, the client application may determine which engines of a server system support which features. Even though this information may not be provided by the server, this information may be obtained from documentation for the server system, through discussion with the developers of the server system or its engines, or by other means. This capability information may be stored in a client library and it may used to overcome the limitations of a system level capability check. For instance, the library may indicate whether a particular feature is actually supported by the server and the client application can use this information to override the system level list of supported features received from the server. This is advantageous because the user is provided with more advanced functionality and in some situations, it may not be practical or possible for the server to be modified send a detailed list of engine-level supported features (e.g., for technical or compatibility reasons).

As described above, it may be advantageous to determine engine-level capabilities of an OLAP system instead of relying on the system level capabilities since the system level may indicate that certain features are not support when those features actually are supported in a certain context. The client library can indicate which features are supported in which contexts by setting flags to indicate whether the feature is supported or not. A method for determining context aware capabilities is described below with respect to FIG. 3.

Figure 3:
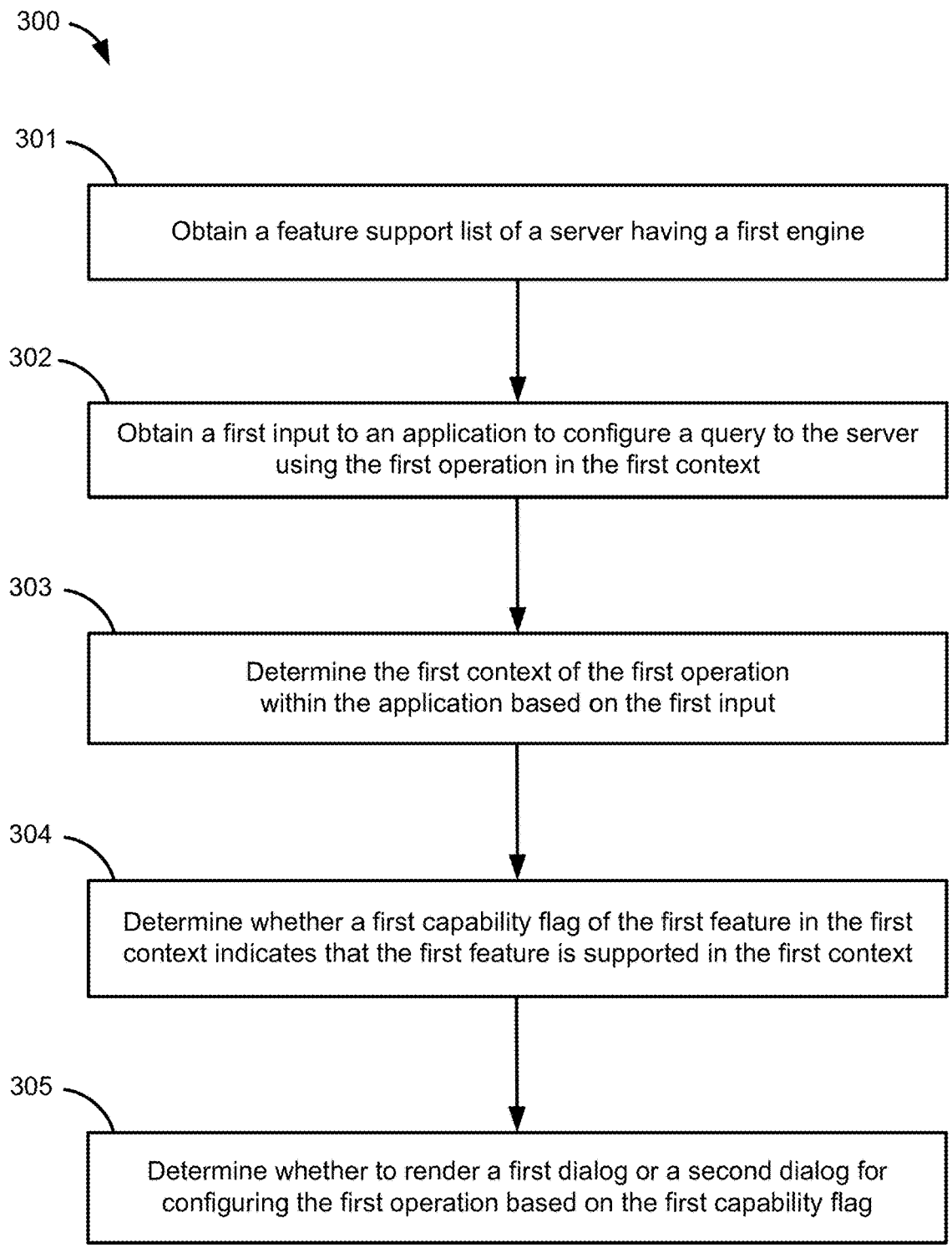
FIG. 3 shows a flowchart of a method, according to an embodiment.

FIG. 3 shows a flowchart 300 of a method, according to an embodiment. The method of FIG. 3 and provide context aware capabilities for a client such that an appropriate dialog can be rendered for the supported capabilities. The components of the method may be performed in a different order, unless otherwise noted.

At 301, the method obtains a feature support list of a server having a first engine. The feature support list indicates that the server does not support a first feature for a first operation based on the first engine not supporting the first feature. In some embodiments the server may have a second engine that support the first feature and the server's feature support list may indicate that the server does not support because not all of the engines support the first feature (e.g., the support list is at the system-level). In some embodiments, the first operation is a filtering operation and the first feature is a complex filtering feature. In some embodiments, the server is configured to process the first operation using the second engine in a first context where the second engine supports the first feature in the first context.

At 302, the method obtains a first input to an application to configure a query to the server using the first operation in the first context. In some embodiments, such as where the first operation is a filtering operation and the first feature is a complex filtering feature, the first context may be a restricted measure context. In some embodiments, the first input to the application may be an input provided by a user of the application. For example, the first input may include a selection of a user interface element (e.g., a button, menu item, or checkbox) to create a restricted measure (e.g., a measure restricted to a dimension, such as time, location, or dimensions selected by the user, etc.).

At 303, the method determines the first context of the first operation within the application based on the first input. For example, the first input may include a selection of a user interface element (e.g., a button, menu item, or checkbox) to create a restricted measure (e.g., a measure restricted to a dimension, such as time, location, or dimensions selected by the user, etc.). The application may be configured such that this the user interface element calls a particular operation, such as the first operation, when selected. In some embodiments, the determination of the first context includes navigating to a class for the first operation, and wherein the determination of whether the first capability flag indicates that the first feature is supported in the first context includes calling a subroutine for the class to obtain the first capability flag, wherein the class for the first operation is wrapped with a decorator that sets the first capability flag.

In some embodiments, the determination of the first context includes navigating to a class for the first operation (e.g., navigating within a class model), wherein the class for the first operation is not wrapped with a first decorator, and the navigation further includes navigating to a parent of the class, the parent being wrapped with a second decorator that sets the first capability flag.

At 304, the method determines whether a first capability flag indicates that the first feature is supported in the first context. The first capability flag may override the feature support list of the server with respect to the first feature. The first capability flag may indicate engine-level capabilities instead of system-level capabilities, for example. In some embodiments, capability flags may be set using decorators in a class model, as further described below with respect to FIG. 5.

At 305, the method may determine whether to render a first dialog or a second dialog for configuring the first operation based on the first capability flag. The first dialog may include one or more interface elements for configuring the first operation using the first feature. The second dialog may not include the one or more interface elements for configuring the first operation using the first feature. For example, the first dialog may be an advanced dialog while the second dialog may be a simple dialog. The first dialog may be rendered when the first capability flag indicates that the first feature is supported in the first context, thereby overriding the feature support list of the server indicating that the server does not support a first feature. The second dialog may be rendered when the feature support list of the server indicates that the server does not support a first feature and the feature capability flag does indicate that the server supports the first feature. For example, engine-level capabilities indicated by a capability flag in a class model may override system-level capabilities obtained from the server in a capability handshake.

In some embodiments, the second dialog is rendered based on the feature capability flag not indicating that the server supports the first feature in the first context for the first operation and based on the feature support list of the server indicating that the server does not support the first feature.

In some embodiments, the method further obtains a second input to the application to configure a second query to the server using a second operation in a second context. In such embodiments, the method may further determine the second context of the second operation within the application based on the second input. In such embodiments the method may further determine to render a third dialog not including one or more interface elements for configuring the second operation using the second feature based on a second capability flag of the second feature in the second context indicating that the second feature is not supported in the second context. In such embodiments, the feature support list may indicate that the server does support the second for the second operation based on the first engine and the second engine supporting the second feature.

In some embodiments the dialog may be configured by the user and the application may send a request to the server based on the configurations of the dialog. For example, a query may be filtered based on the user's configuration of the dialog.

Features and advantages of the above method enable the actually supported features of a server to be determined based on the context. Those features can be used to render a dialog for user queries to the server, thereby allowing the user to take advantage of potentially more advanced and complex features even if the server's system-level list of supported features indicates that the feature is not supported. Thus, the user can get better functionality and feature support for the client application even in situations where it is impractical to modify the server's capability handshake process.

Figure 4:
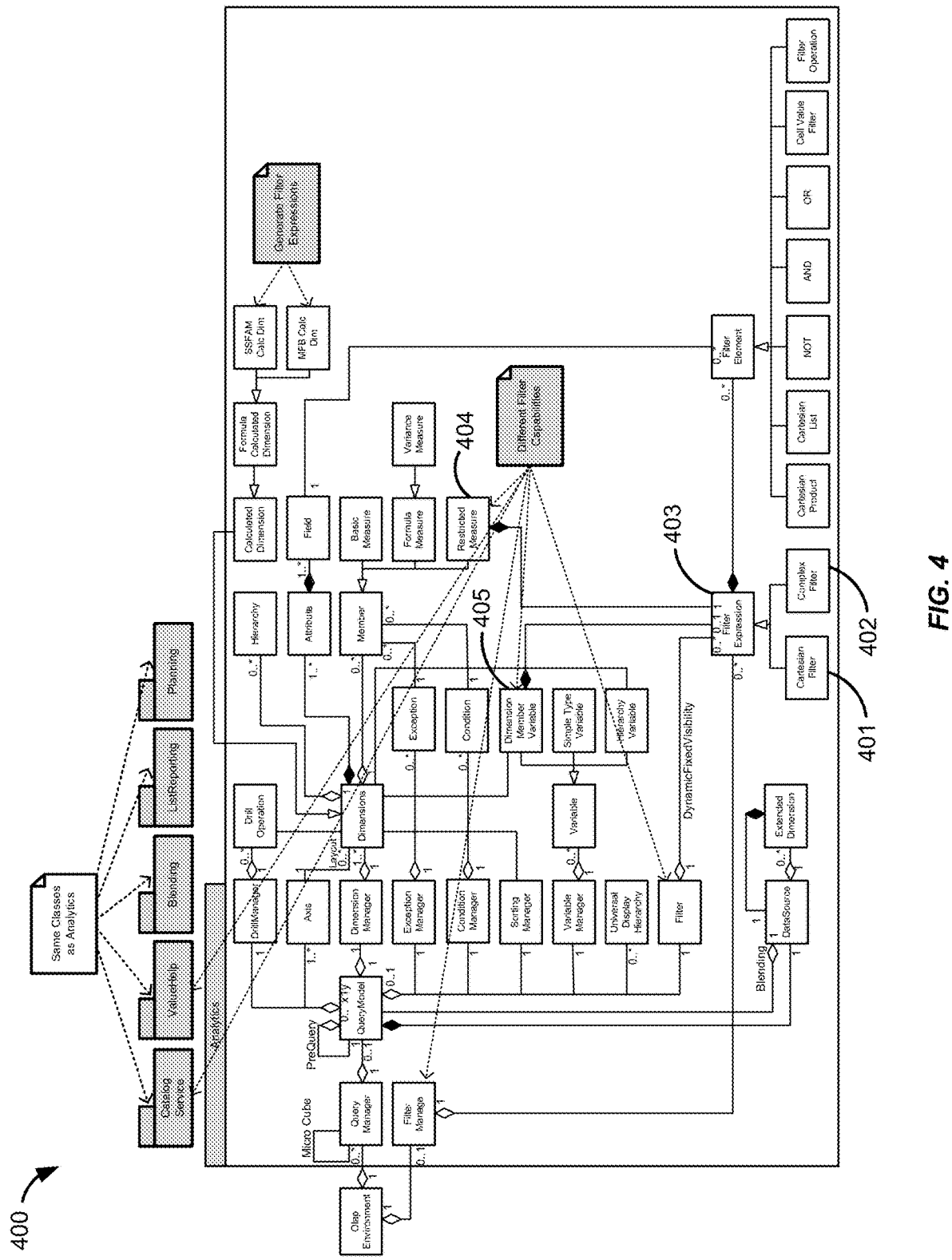
FIG. 4 shows a simplified class model of a client library, according to an embodiment.

FIG. 4 shows a diagram of a simplified class model 400 of a client library, according to an embodiment. In this embodiment, as shown in the diagram, the "Cartesian Filter" class 401 and the "Complex Filter" class 402 inherit the "Filter Expressions" class 403. The "Filter Expression" class 403 is part of the "restricted measure" class 404 and it is part of the "DimensionMemberVariable" class 405. The client library may indicate that complex filtering 404 is supported by a particular server in the "restricted measure" context (e.g., by a particular engine of the server that handles processing of restricted measures) but not in other filtering contexts. Accordingly, if a restricted measure is being created, a dialog supporting complex filtering may be presented to the user.

As shown in FIG. 4, restricted measures may not be the only context where the server actually supported a feature that is indicated as not being supported by the server's system-level list of supported features. In this embodiment, the "Catalog Service," "ValueHelp," "FilterManager," "Filter," and "DimensionMemberVariable" classes may also have different filter capabilities compared to the server's system-level capability information.

As discussed above, checking for supported features at the system level may not be sufficient because it may return the wrong answer. This may be problematic, for example, in situations where a client may have a simple filter dialog to render in case the "ComplexFilter" feature is not supported and a more advanced filter dialog to use in case it is supported. A check at the system level would indicate "ComplexFilter" as unsupported and as such would show only the simplified filter dialog when creating a restricted measure. However, the client library could be used to determine whether "ComplexFilter" is supported in the current context. Features and advantages of the techniques described herein enable the application to provide the user with dialogs providing the ComplexFilter feature where this feature is actually supported by the server even though the server's system-level list of capabilities indicates that the feature is not supported.

Figure 5:
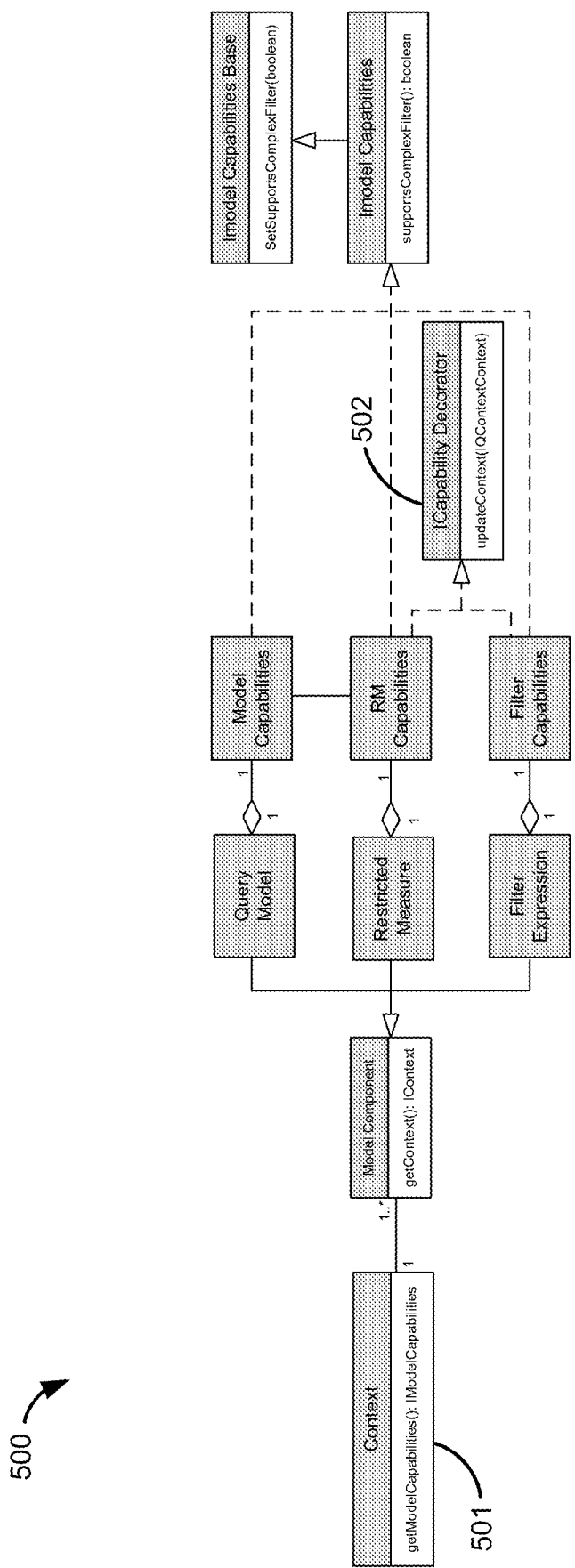
FIG. 5 shows a simplified class model providing context aware capabilities, according to an embodiment.

FIG. 5 shows a simplified class model 500 providing context aware capabilities, according to an embodiment. The client (e.g., client 110 or client 220) can determine whether a particular feature is supported in a specific context by using a "getModelCapabilities" method 501 at the common super interface to get the supported capabilities. The client can check at any component what features are supported. The logic in which places the actually supported features differ from the indicated capabilities of the server may be determined using a client library. Accordingly, the capabilities of the server can be modified depending on the context. Instead of checking at a system level, the client application may navigate to the correct context to check supported features.

The classes where the supported capabilities are different may create a decorator 502 which wraps the higher-level capabilities and can overwrite certain flags (e.g., 3-state Boolean values). Generally, a decorator is a conceptual pattern that allows adding new behaviors to objects dynamically by placing them inside special wrapper objects. In cases where a flag was not changed, the value from the wrapped capabilities are returned.

Dynamic references to the higher-level capabilities may allow objects to be moved to a different component and return correct capabilities. If cases where there is no decorator, then the determination of capabilities may navigate to the parent's capabilities. For example, a filter can be created without any context or parent object, in which case most features are not supported. Once the filter is used as a query filter it will correctly reflect the actual capabilities of the server in the query filter context. If the filter were moved to a restricted measure context instead, the supported features would be different.

Going back to FIG. 4, decorators can be set (e.g., using 3-state Boolean flags) at the "Catalog Service," "ValueHelp," "FilterManager," "Filter," "DimensionMemberVariable," and "Restricted Measure" in order to provide context aware capabilities since these classes are the classes where the actual capability of the server is different from the system-level capability information provided by the server.

In other cases, a particular features may be technically valid, but it may not make sense to use that feature in every context. In such cases, a server might support the "ComplexFilter" feature but a variable which supports only a single value selection cannot leverage that feature. In this situation, by restricting such variables to support only simple filters (e.g., not complex filters) the workflow for the end user can be simplified.

Figure 6:
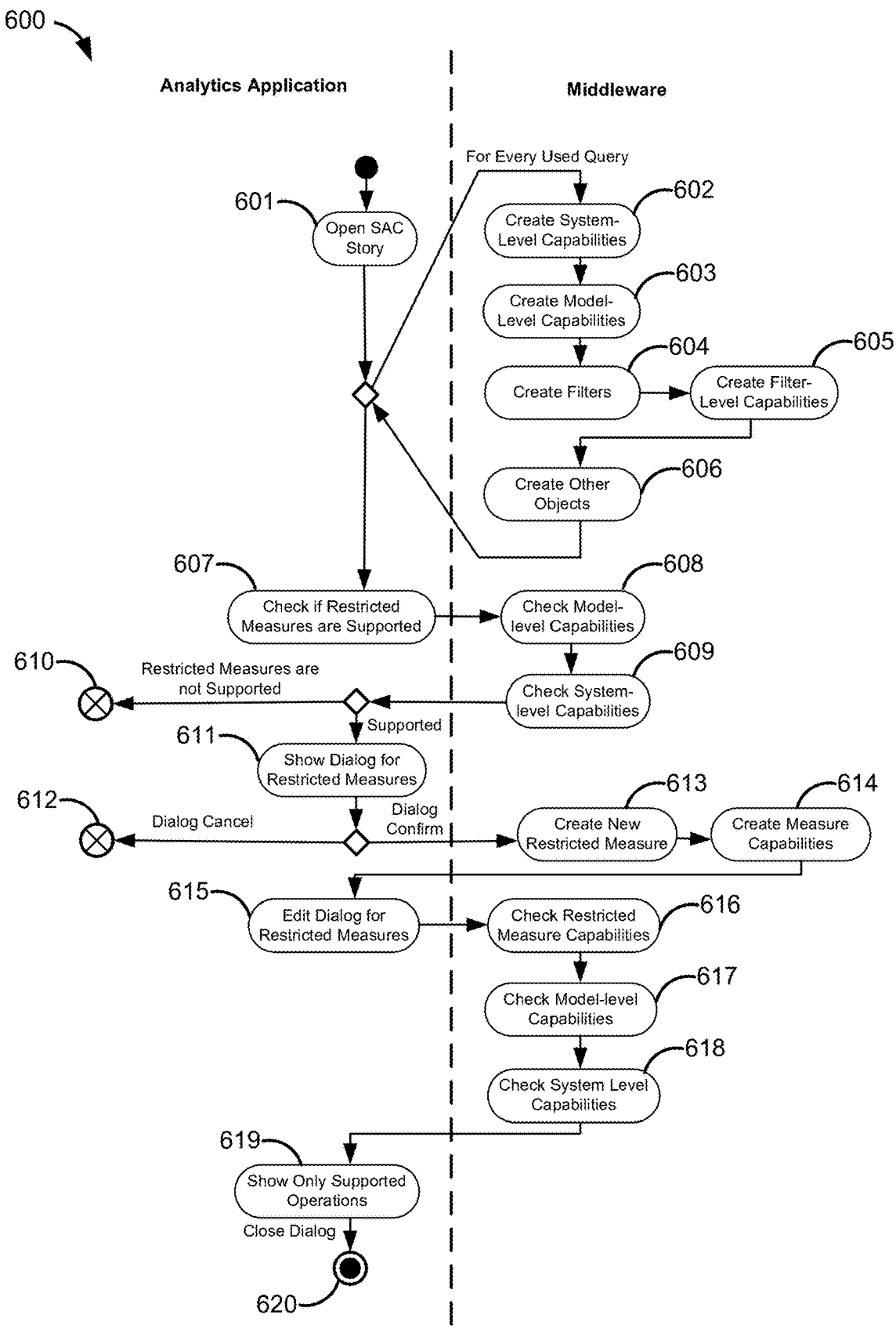
FIG. 6 shows a flowchart of an exemplary method for determining context aware capabilities, according to an embodiment.

FIG. 6 shows a flowchart 600 providing a method for determining context aware capabilities, according to an embodiment. The method of FIG. 6 allows an application to use middleware determine whether restricted measures are supported or not and render an appropriate dialog showing the supported operations. This method may be performed by an analytics application and middleware at a client, such as the client 110 of FIG. 1. Similar methods may be used to determine capabilities and render an appropriate dialog for other operations and features of an application.

At 601, the analytics application opens a "story" page (e.g., webpage) including visualizations (e.g., charts, graphs, or tables) of data. The application may query a server to obtain data to generate the visualizations. For every query, the middleware performs steps 602-606. At 602 the middleware creates system level capabilities and, at 603, model level capabilities. At 604 the middleware creates filters and, at 605, filter level capabilities. At 606 the middleware may create other objects.

At 607, the application checks if restricted measures are supported. To do this, at 608 the middleware checks model-level capabilities (e.g., based on a client library) and, at 609, checks the system-level capabilities (e.g., based on a list of supported features obtained from a server).

If restricted measures are not supported, the method ends at 610. If restricted measures are supported, at 611 the application shows a dialog for restricted measures. If the dialog is canceled the method ends at 612. If the dialog is not canceled then at 613 the middleware creates a new restricted measure and, at 614, creates measure capabilities. At 615 the application provides an edit dialog for restricted measures. The middleware checks restricted measure capabilities at 616, checks the model-level capabilities at 617, and checks the system-level capabilities at 618.

At 619, the application shows only the supported operations in the dialog. The supported operations being based on the restricted measure capabilities, the model-level capabilities, and the system-level capabilities. At 620 the method ends when the dialog is closed.

By this method, the application can render a dialog based on context aware capabilities. This is advantageous because by checking supported features in the correct context, more features can be exposed to the end-user which then can build more advanced content and may be able to cover more use-cases. Or, in some situations, by checking supported features in the correct context, less features can be exposed to the end-user which then can enjoy simpler UI and such better user experience if the advanced features do not benefit the user in that situation.

Figure 7:
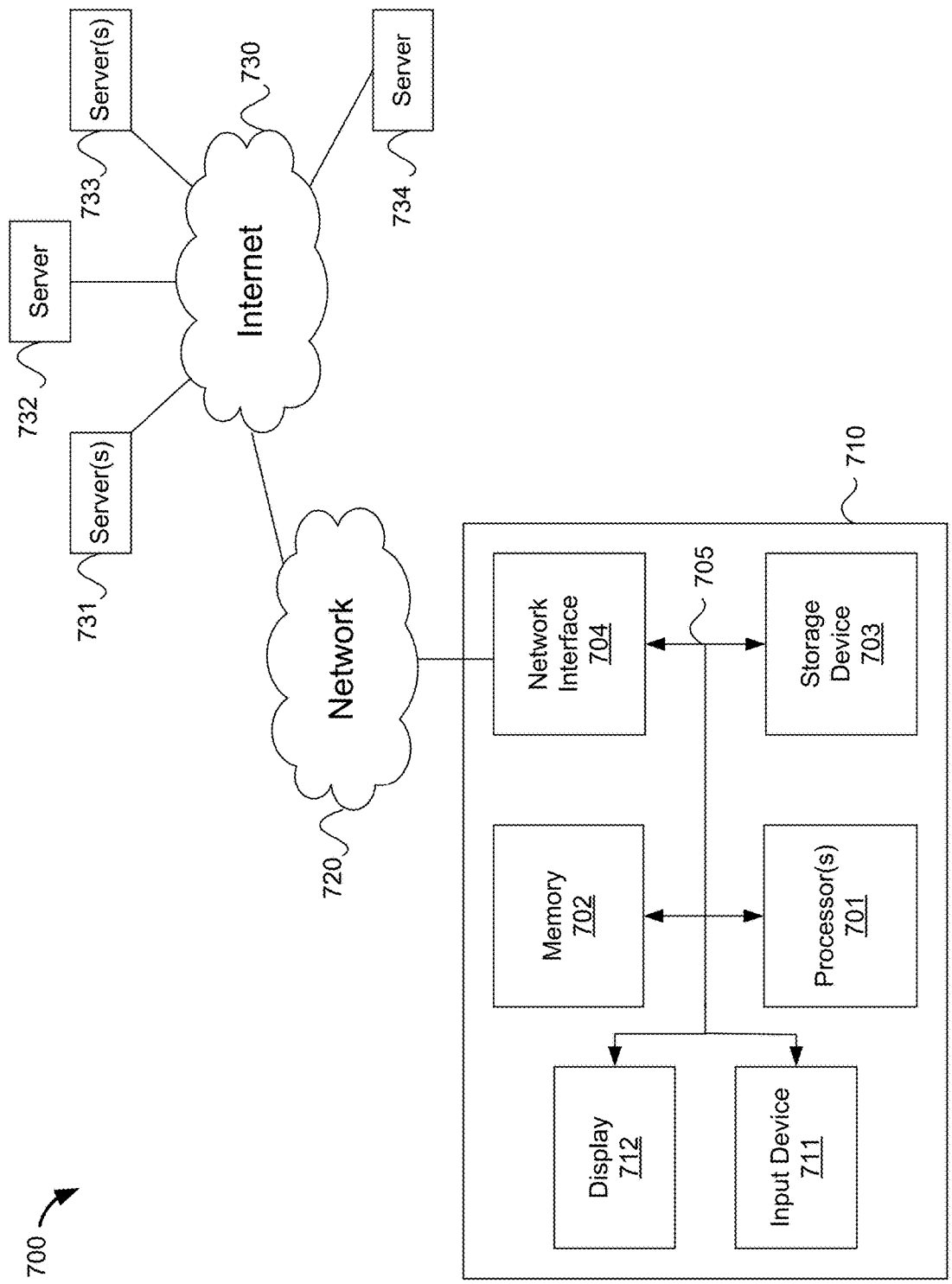
FIG. 7 shows a diagram of hardware of a special purpose computing machine for providing context aware capabilities, according to an embodiment.

FIG. 7 shows a diagram of hardware of a special purpose computing machine for providing context aware capabilities, according to an embodiment. That is, the hardware shown in FIG. 7 may be used to implement the context aware capabilities techniques described herein.

A computer system 710 is illustrated in FIG. 7. The computer system 710 includes a bus 705 or other communication mechanism for communicating information, and one or more processor(s) 701 coupled with bus 805 for processing information. The computer system 710 also includes a memory 702 coupled to bus 705 for storing information and instructions to be executed by processor 701, including information and instructions for performing some of the techniques described above, for example. This memory may also be used for storing programs executed by processor(s) 701. The memory 702 may include instructions for implementing the context aware capabilities processes and techniques described above. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, for example. Storage device and memory are both examples of non-transitory computer readable storage mediums.

The computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

The computer system also includes a network interface 704 coupled with bus 705. The network interface 704 may provide two-way data communication between computer system 710 and a network 720. The network interface 704 may be a wireless or wired connection, for example. The computer system 710 can send and receive information through the network interface 704 across a local area network, an Intranet, a cellular network, or the Internet, for example. In the Internet example, a browser, for example, may access data and features on backend systems that may reside on multiple different hardware servers 731-734 across the network. The servers 731-734 may be part of a cloud computing environment, for example.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations, and equivalents may be employed without departing from the scope of the present disclosure as defined by the claims.

What is claimed is:

1. A computer system, comprising:
one or more processors; and
one or more machine-readable medium coupled to the one or more processors and storing computer program code comprising sets instructions executable by the one or more processors to:
obtain a feature support list of a server having a first engine, the feature support list indicating that the server does not support a first feature for a first operation based on the first engine not supporting the first feature;
obtain a first input to an application to configure a query to the server using the first operation in a first context;
determine the first context of the first operation within the application based on the first input;
determine whether a first capability flag indicates that the first feature is supported in the first context, the first capability flag overriding the feature support list of the server with respect to the first feature; and determine whether to render a first dialog or a second dialog for configuring the first operation based on the first capability flag, the first dialog including one or more interface elements for configuring the first operation using the first feature, the second dialog not including the one or more interface elements, the first dialog being rendered when the first capability flag indicates that the first feature is supported in the first context, overriding the feature support list of the server indicating that the server does not support the first feature.

2. The computer system of claim 1, wherein the server is configured to process the first operation using the second engine in the first context, the second engine supporting the first feature in the first context.

3. The computer system of claim 1, wherein the determination of the first context includes navigating to a class for the first operation, and wherein the determination of whether the first capability flag indicates that the first feature is supported in the first context includes calling a subroutine for the class to obtain the first capability flag, wherein the class for the first operation is wrapped with a decorator that sets the first capability flag.

4. The computer system of claim 1, wherein the determination of the first context includes navigating to a class for the first operation, wherein the class for the first operation is not wrapped with a first decorator, and the determination of the first context further includes navigating to a parent of the class, the parent being wrapped with a second decorator that sets the first capability flag.

5. The computer system of claim 1, wherein the second dialog is rendered based on the feature capability flag not indicating that the server supports the first feature in the first context, and based on the feature support list of the server indicating that the server does not support the first feature.

6. The computer system of claim 1, wherein the computer program code further comprises sets of instructions executable by the one or more processors to:
obtain a second input to the application to configure a second query to the server using a second operation in a second context;
determine the second context of the second operation within the application based on the second input;
determine to render a third dialog not including one or more interface elements for configuring the second operation using the second feature based on a second capability flag indicating that the second feature is not supported in the second context, the feature support list indicating that the server does support the second feature for the second operation based on the first engine and the second engine supporting the second feature.

7. The computer system of claim 1, wherein the first operation is a filtering operation, wherein the first feature is a complex filtering feature, and wherein the first context is a restricted measure context.

8. One or more non-transitory computer-readable medium storing computer program code comprising sets of instructions to:
obtain a feature support list of a server having a first engine, the feature support list indicating that the server does not support a first feature for a first operation based on the first engine not supporting the first feature;
obtain a first input to an application to configure a query to the server using the first operation in a first context;
determine the first context of the first operation within the application based on the first input;

determine whether a first capability flag indicates that the first feature is supported in the first context, the first capability flag overriding the feature support list of the server with respect to the first feature; and
determine whether to render a first dialog or a second dialog for configuring the first operation based on the first capability flag, the first dialog including one or more interface elements for configuring the first operation using the first feature, the second dialog not including the one or more interface elements, the first dialog being rendered when the first capability flag indicates that the first feature is supported in the first context, overriding the feature support list of the server indicating that the server does not support the first feature.

9. The non-transitory computer-readable medium of claim 8, wherein the server is configured to process the first operation using the second engine in the first context, the second engine supporting the first feature in the first context.

10. The non-transitory computer-readable medium of claim 8, wherein the determination of the first context includes navigating to a class for the first operation, and wherein the determination of whether the first capability flag indicates that the first feature is supported in the first context includes calling a subroutine for the class to obtain the first capability flag, wherein the class for the first operation is wrapped with a decorator that sets the first capability flag.

11. The non-transitory computer-readable medium of claim 8, wherein the determination of the first context includes navigating to a class for the first operation, wherein the class for the first operation is not wrapped with a first decorator, and the determination of the first context further includes navigating to a parent of the class, the parent being wrapped with a second decorator that sets the first capability flag.

12. The non-transitory computer-readable medium of claim 8, wherein the second dialog is rendered based on the feature capability flag not indicating that the server supports the first feature in the first context, and further based on the feature support list of the server indicating that the server does not support the first feature.

13. The non-transitory computer-readable medium of claim 8, wherein the computer program code further comprises sets of instructions to:
obtain a second input to the application to configure a second query to the server using a second operation in a second context;
determine the second context of the second operation within the application based on the second input;
determine to render a third dialog not including one or more interface elements for configuring the second operation using the second feature based on a second capability flag indicating that the second feature is not supported in the second context, the feature support list indicating that the server does support the second feature for the second operation based on the first engine and the second engine supporting the second feature.

14. The non-transitory computer-readable medium of claim 8, wherein the first operation is a filtering operation, wherein the first feature is a complex filtering feature, and wherein the first context is a restricted measure context.

15. A computer-implemented method, comprising:
obtaining, by a client computer, a feature support list of a server having a first engine, the feature support list indicating that the server does not support a first feature for a first operation based on the first engine not supporting the first feature;

obtaining, by the client computer, a first input to an application to configure a query to the server using the first operation in a first context;

determining, by the client computer, the first context of the first operation within the application based on the first input;

determining, by the client computer, whether a first capability flag indicates that the first feature is supported in the first context, the first capability flag overriding the feature support list of the server with respect to the first feature; and determining, by the client computer, whether to render a first dialog or a second dialog for configuring the first operation based on the first capability flag, the first dialog including one or more interface elements for configuring the first operation using the first feature, the second dialog not including the one or more interface elements, the first dialog being rendered when the first capability flag indicates that the first feature is supported in the first context, overriding the feature support list of the server indicating that the server does not support the first feature.

16. The computer-implemented method of claim 15, wherein the server is configured to process the first operation using the second engine in the first context, the second engine supporting the first feature in the first context.

17. The computer-implemented method of claim 15, wherein the determination of the first context includes navigating to a class for the first operation, and wherein the determination of whether the first capability flag indicates that the first feature is supported in the first context includes calling a subroutine for the class to obtain the first capability flag, wherein the class for the first operation is wrapped with a decorator that sets the first capability flag.

18. The computer-implemented method of claim 15, wherein the determination of the first context includes navigating to a class for the first operation, wherein the class for the first operation is not wrapped with a first decorator, and the determination of the first context further includes navigating to a parent of the class, the parent being wrapped with a second decorator that sets the first capability flag.

19. The computer-implemented method of claim 15, wherein the second dialog is rendered based on the feature capability flag not indicating that the server supports the first feature in the first context, and further based on the feature support list of the server indicating that the server does not support the first feature.

20. The computer-implemented method of claim 15, wherein the first operation is a filtering operation, wherein the first feature is a complex filtering feature, and wherein the first context is a restricted measure context.

* * * * *